Oct. 14, 1969   R. J. DODGE   3,473,084
CONSTANT INTENSITY LAMP CONTROL WITH AN OPTICAL
FEEDBACK CONTROL
Filed Dec. 6, 1967   3 Sheets-Sheet 2

INVENTOR
Robert J. Dodge

BY Browning, Hyer,
Eckenroth + Thompson

ATTORNEY

United States Patent Office 3,473,084
Patented Oct. 14, 1969

3,473,084
CONSTANT INTENSITY LAMP CONTROL WITH AN OPTICAL FEEDBACK CONTROL
Robert J. Dodge, Houston, Tex., assignor to Automatic Power Inc., Houston, Tex., a corporation of Delaware
Filed Dec. 6, 1967, Ser. No. 688,410
Int. Cl. H05b 37/02, 39/04
U.S. Cl. 315—151
17 Claims

ABSTRACT OF THE DISCLOSURE

A power control for regulating the power applied to operate a lamp including an SCR connected between the lamp and one side of a battery to turn the lamp on when the SCR is switched to its low impedance state. A uni-junction relaxation oscillator provides a series of pulses which causes the SCR to switch to its low impedance state at a predetermined rapid rate, and the SCR remains so switched each time due to a holding current passing through its power electrodes. A photoresistive element connected to a voltage divider string across the battery is mounted close to the lamp and its resistance decreases as the lamp intensity increases. The voltage drop across the element is used to drive a transistor and when this drive reaches a certain level a voltage signal is produced from the emitter of the transistor. This signal causes a second SCR, connected through a capacitor to the first-mentioned SCR, to switch to its low impedance state and bias the first-mentioned SCR below its holding current to cut the lamp off. The lamp is thus switched on and off by a square wave voltage pulse of a rapid rate whose amplitude is substantially battery voltage and width is determined by the intensity of the light emitted.

---

The present invention relates to power controls and, more particularly, to a power control especially adapted for controlling the power applied to a light source from a direct current voltage supply to maintain the intensity of the light emitted by the source substantially constant.

It is oftentimes desirable that the power applied to a load, such as a light source, from a direct current voltage supply be controlled to maintain a desired output level from the load as one or more variables, such as the voltage level of the direct current supply, varies. Thus, to compensate for variations in supply voltage level, many types of voltage regulation circuits have been developed which function to maintain the amplitude of the voltage applied to the load constant. However, most voltage regulation circuits are inherently wasteful of energy in that they maintain the energy available to the load constant and dissipate any excess energy available from the supply. In many applications, this dissipation of excess energy is not a substantial disadvantage. However, in other applications, such as the supplying of power to offshore flashing navigation lights, lower power consumption is vital because of the high cost of supplying power.

The resistance of a lamp will normally increase as the lamp is used. Thus, at a constant voltage, the light output will decrease as a function of time. Further, blackening of the lamp envelope as the lamp is used also reduces the light output. It will, therefore, be apparent that it is highly desirable that the power applied to the lamp be regulated as a function of the light intensity instead of voltage alone.

The present invention provides a power control adapted to be connected in series with a direct current voltage supply and a lamp or similar source of radiant energy. The power control of the present invention is effective to produce a square wave signal of substantially constant pulse repetition rate whose amplitude varies as a function of the supply voltage level. There is also provided means for varying the width of each pulse as a function of the intensity of the energy emitted from the lamp or energy source to maintain the level of energy emitted from the source substantially constant. It will, therefore, be seen that in accordance with the present invention, neither a constant voltage nor a constant current is applied to the load, but rather the power applied to the load is varied to maintain the emitted energy constant.

The means for generating and applying to the load the square wave signal is a switching means connected in series with the radiation source and the direct current voltage supply. The square wave is produced by controlling the conduction state of the switching means. Since power is utilized only when the switching means is in the low impedance state, virtually no power is wasted. The square wave can be turned on and off by a suitable timer to provide flashing of the lamp.

A further advantage of the invention is that the average current supplied in the conductors from the direct current source is reduced and, therefore, the power loss between the source and the power control is reduced.

Oftentimes lamps are parallel connected to a common source of voltage but are at great distances from each other so that the voltage applied to the last lamp in the string may be considerably less than that supplied to the first lamp, due to the voltage loss in the connecting line. By utilizing the present invention at each of the lamps, the intensity from each can be maintained at substantially equal constant levels, and the energy loss in the connecting lines between the lamps can be substantially reduced.

Also, a further advantage of this invention is that the incandescent time of the filament is shortened which is particularly advantageous when the lamp is flashed so as to increase the effective intensity.

The features of the present invention which are believed novel are set forth with greater particularity in the appended claims. Many objects and advantages of the invention will, however, become apparent to those skilled in the art as the following detailed description of a preferred embodiment of the same unfolds when taken in conjunction with the appended drawings, wherein FIG. 1 is a schematic diagram illustrating a preferred embodiment of the present invention;

Figure 1:
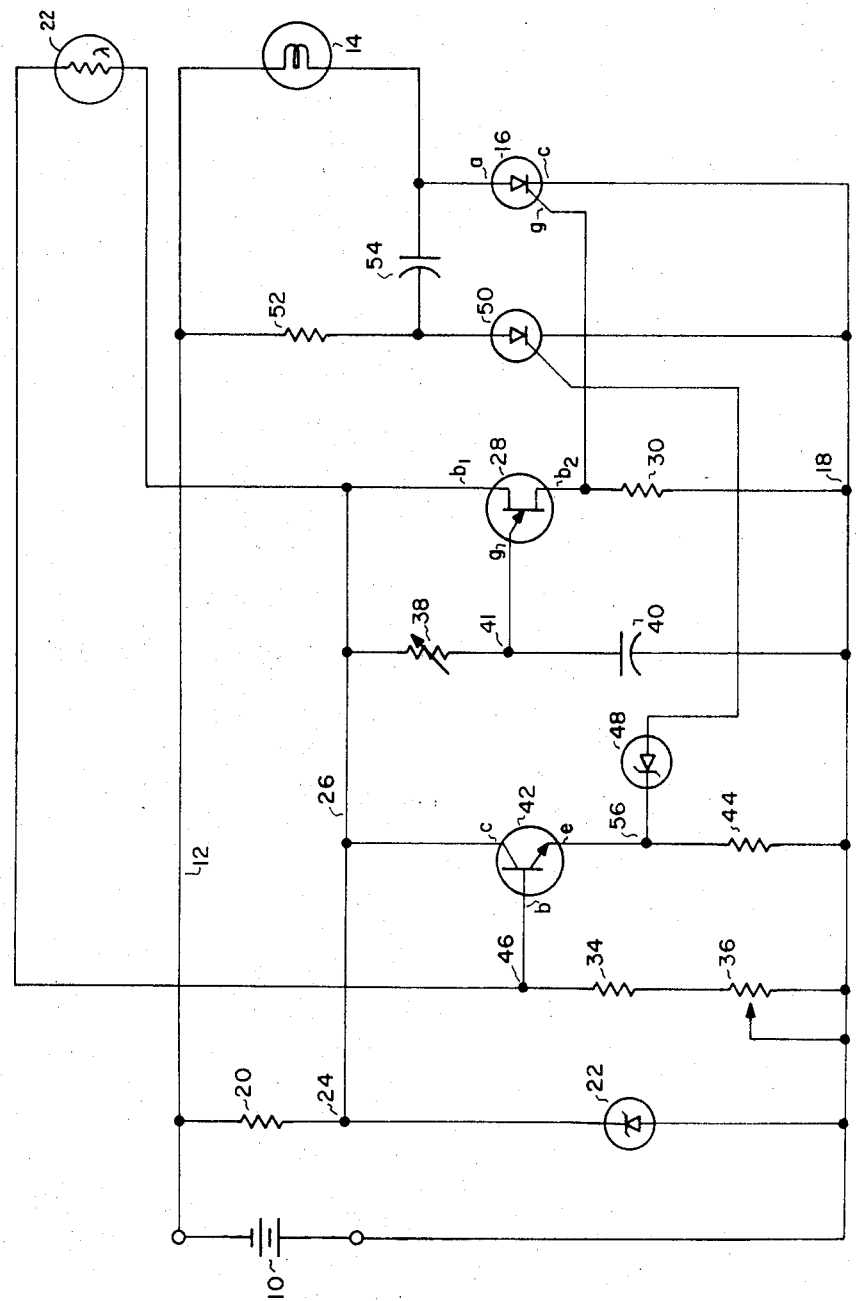

Turning now to FIG. 1 of the drawing, there is shown a battery 10 whose positive terminal is connected through line 12 to one side of lamp 14. The other side of the lamp 14 is connected to the anode $a$ of silicon-controlled rectifier (SCR) 16, the cathode $c$ of SCR 16 being connected through line 18 to the negative terminal of the battery 10. As is well known in the art, the SCR normally exhibits very high impedance between its anode and cathode. The SCR is switched to a quasi stable low impedance state when a control signal is applied to its gate electrode $g$, and remains in the low impedance state so long as holding current flows. If the current flowing through the anode and cathode of the SCR falls below the holding current, the device will return to its normal high impedance state. So long as the SCR 16 exhibits a high impedance state, substantial current will not flow through the lamp 14 and radiation will not be emitted therefrom.

There is also provided means for controlling the conductivity state of the SCR 16 to thereby control the effective power applied to the lamp 14 as a function of the intensity of radiation emitted by the lamp 14. Thus, a resistor 20 and a Zener diode 22 are connected in series between line 12 and line 18. The juncture point 24 between resistor 20 and Zener diode 22 is connected by line 26 to base $b_1$ of a uni-junction transistor 28. The other base $b_2$ of the uni-junction transistor 28 is connected through resistor 30 to line 18. Line 26 is also connected through photoresistive device 32, resistor 34 and variable resistor 36 to line 18. A variable resistor 38 and a capacitor 40 are also connected between line 26 and line 18, as is the collector-emitter circuit of transistor 42 and resistor 44. The juncture 41 between resistor 38 and capacitor 40 is connected to the gate $g$ of uni-junction transistor 28. The base of the transistor 42 is connected to juncture 46 between the photoresistive device 32 and resistor 34. The emitter of the transistor 42 is connected through a Zener diode 48 to the gate electrode of a second silicon-controlled rectifier 50. The anode of SCR 50 is connected through resistor 52 to line 12, the cathode of SCR 50 being connected to line 18. The anode of SCR 50 is also connected through a capacitor 54 to the anode of SCR 16.

It will be readily apparent to those skilled in the art that the resistor 20 and Zener diode 22 cooperate to maintain the potential appearing on line 26 at the Zener voltage of the device 22. It will be appreciated that at all times a certain amount of power will be dissipated in the resistor 20 since the minimum operating voltage of the battery 10 is suitably in excess of the Zener voltage of the Zener diode 22. However, since the components which receive power from the line 26 only utilize a small amount of power, the amount of power dissipated in the resistor 20 is quite small.

The uni-junction transistor 28, resistor 30, resistor 38 and capacitor 40 define a relaxation oscillator of conventional type. Thus, when the uni-junction transistor is in its high impedance state, voltage appearing across the two bases of the uni-junction transistor will be substantially equal to the Zener voltage of the Zener diode 22. The capacitor 40 is charged toward the Zener voltage of Zener diode 22 through a charge path comprising the variable resistor 38. At some time depending upon the characteristics of the uni-junction transistor and the resistance of resistor 38, the capacitor 40 will be charged to a sufficiently high voltage to permit the capacitor 40 to discharge through the gate electrode of uni-junction transistor 28.

A voltage is developed across the resistor 30 of an amplitude sufficient to bias the SCR 16 to switch to its low impedance state, as the capacitor 40 discharges. When the SCR 16 switches to its low impedance state, current will begin to flow through the lamp 14, causing the filament thereof to become heated with a resultant emission of light. Also, in the event the SCR 50 should be conductive, when the SCR 16 switches to the low impedance state, a negative going pulse is applied through capacitor 54 to the anode of SCR 50, biasing the SCR 50 off.

Figure 2:
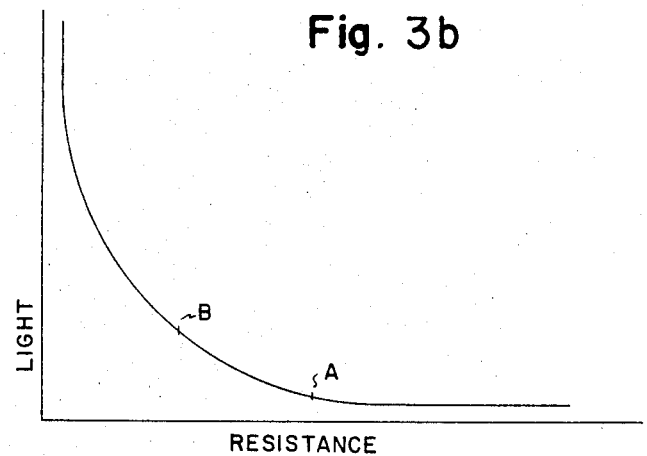
FIG. 2 is a curve illustrating the manner in which the resistance of a photoresistive device varies as a function of the light intensity impinging upon the device.

SCR 50 is controlled on by a circuit comprising the photosensitive device 32, resistor 34, resistor 36, transistor 42, resistor 44 and Zener diode 48. Photosensitive device 32 is mounted in proximity to lamp 14 so that it responds to the emission of light therefrom. As shown in FIG. 2 of the drawings, the resistance of the photosensitive device 32 is quite high for low levels of light impinging thereon and very low when the intensity of the light impinging on the device is high. For example, the resistance of a typical photosensitive device may vary from one megohm at a light intensity of 0.1 foot candles to a resistance of 100 to 1,000 ohms at 1,000 foot candles of light intensity. The photocell can suitably be operated between points A and B of the curve of FIG. 2 by utilizing appropriate filters and shutters whereby a relatively small change in the amount of light from lamp 14 impinging upon the device 32 will result in a substantial change in its resistance.

As the resistance of the device 32 decreases responsive to an increase in intensity of light impinging thereon, the base of the transistor 42 will become more positive. The resistancce of the collector-emitter circuit of the transistor 42 will decrease as the transistor is biased on, resulting in the potential appearing at juncture point 56. When the intensity of the light emitted by the lamp 14 attains a desired level, the transistor 42 will be driven sufficiently hard that the potential appearing at juncture point 56 will be sufficient to allow current to flow through a Zener diode 48 connected between the emitter of transistor 42 and the gate electrode of SCR 50. This current triggers SCR 50 and causes it to switch from its normally high impedance state to its low impedance state.

When the SCR 50 switches to its low impedance state, the resistor 52 limits the amount of current flowing through the device 50, but provides a source of holding current therefore. It will be noted that as the device 50 switches to the low impedance state, a negative going pulse is applied through the capacitor 54 to bias the SCR 16 in a manner to cause the holding current flowing through the device 16 to fall below the holding current, resulting in the device 16 returning to its normal high impedance state. From the foregoing, it will be seen that a pulse of square wave voltage is provided whose amplitude is substantially equal to the terminal voltage of the battery 10 and whose width is determined by the time required for the intensity of radiation emitted by the lamp 14 to attain a desired level.

Figure 3A:
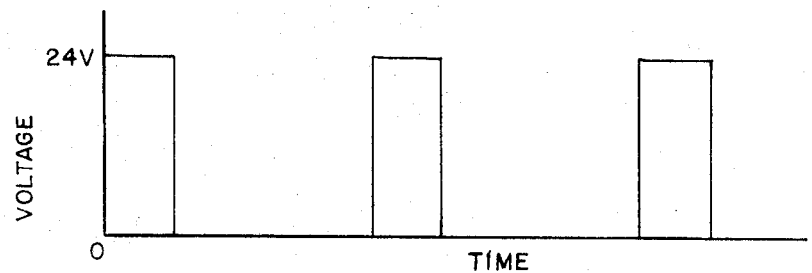
FIGS. 3a and 3b are curves illustrating the manner in which the width of the pulses of the square wave vary as the amplitude of the square wave changes to maintain the intensity of the light emitted from a lamp substantially constant.
Figure 3B:
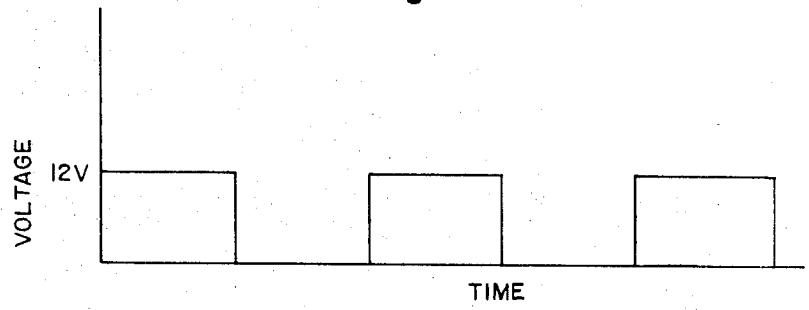

Thus, as illustrated in FIG. 3A, when the battery 10 is new, it may suitably have a terminal voltage of 24 volts DC and, assuming the lamp 14 is of 6 volt rating, the SCR 16 will be conductive or in the low impedance state for approximately ¼ of the period between adjacent pulses. As the batteries age, the terminal voltage will decrease. After, for example, 250 days, the terminal voltage of the battery 10 may be in the order of 12 volts and the SCR 16 will conduct for approximately ½ of the period before the intensity of the light emitted by the lamp 14 becomes sufficiently high to cause the SCR 50 to be turned on. It will be noted that the effective energy or power applied to the lamp 14 is the same in both instances, assuming that the voltage level is the only variable which changes.

The energy is applied to the lamp 14 in a series of pulses, as described above. To prevent visible flicker in the light produced by the lamp 14, it is desirable that the pulse repetition rate of the oscillator comprising the uni-junction transistor 28 be in the order of 40 to 100 pulses per second. In the most practical installations to date, the pulse repetition rate of the relaxation oscillator has been set at 60 pulses per second.

The intensity of light produced by the lamp 14 is controlled by varying the resistance of the variable resistor 36. Thus, if the resistance of resistor 36 is made small, the resistance of the device 32 must also be quite small to drive the transistor 42 sufficiently hard to bias the SCR 50 on. To achieve such a result, the intensity of the light produced by the lamp 14 must be quite high. On the other hand, if the resistance of the resistor 36 is adjusted to a larger value, the intensity of the light can be quite low and still result in turn on of the SCR 50.

Figure 4:
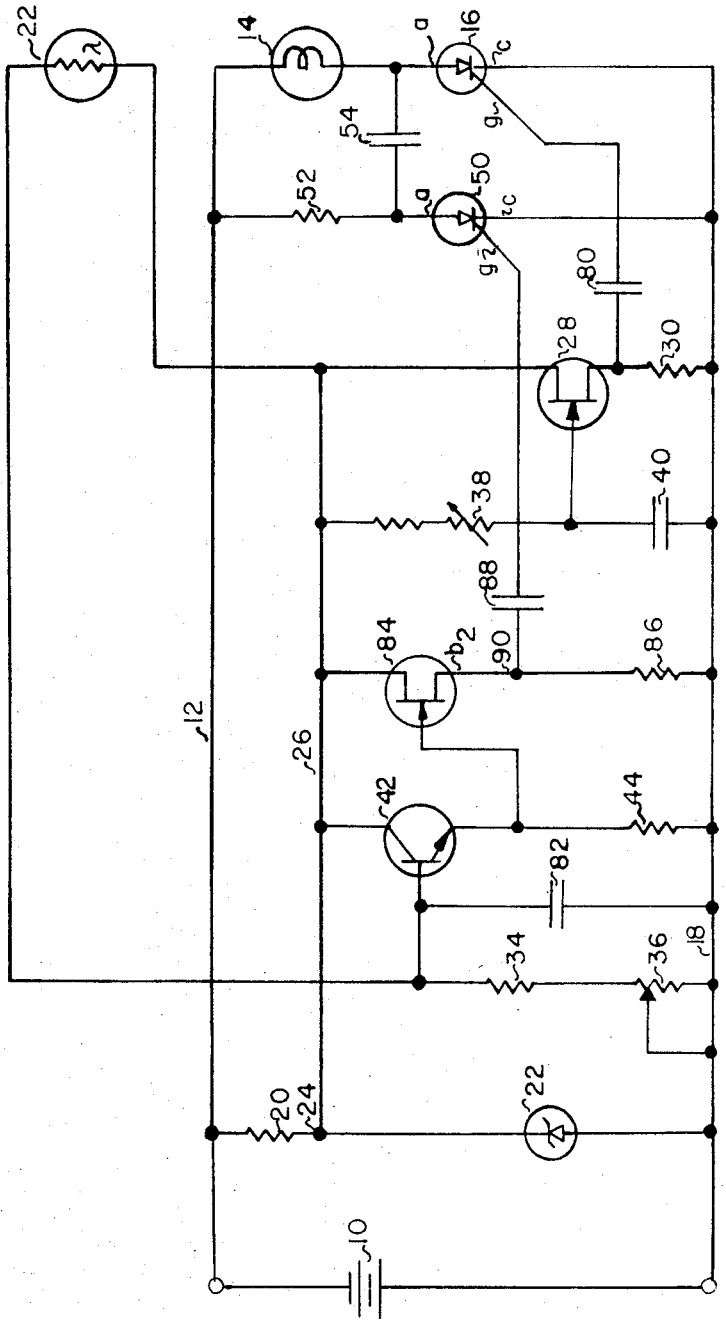
FIG. 4 is a schematic diagram illustrating a second embodiment of the invention.

In FIG. 4 of the drawings, there is shown a second embodiment of the invention, wherein, pulses are applied to the gate electrode of the silicon control rectifiers 16 and 50 in order to obtain more precise control of the time at which each of the silicon control rectifiers is switched to its low impedance state. Thus, in accordance with the embodiment of the invention shown in FIG. 4, there is provided a capacitor 80 which is connected between the gate electrode of silicon control rectifier 16 and the over terminal of resistor 30. The change in potential across resistor 30, resulting from a change in conductivity state of the uni-junction transistor 28, is differentiated by the capacitor 80 and applied to the gate electrode of silicon rectifier 16 as a pulse having a sharp leading edge.

Further, in accordance with the embodiment of the invention shown in FIG. 4, there is provided a capacitor 82 connected between the base of transistor 42 and line 18. The emitter of transistor 42 is connected to the gate of a second uni-junction transistor 84. The base $b_1$ of unijunction transistor 84 is connected to line 26 and the base $b_2$ of uni-junction transistor 84 and resistor 86 is connected through capacitor 88 to the gate electrode of silicon rectifier 50.

It can be readily seen that capacitor 82 will be charged to voltage dependent upon the relative resistance of the photoresistive device 22 and resistors 34 and 36. As transistor 42 is biased on, current will flow through its collector-emitter circuit producing a potential across resistor 44 sufficient to bias uni-junction transistor 84 on. If transistor 42 is biased into saturation, capacitor 82 will discharge through the base-emitter circuit of transistor 42 and the gate base $b_2$ circuit of uni-junction transistor 84 at a rapid rate, providing substantial current flow through resistor 86. The flow of current through resistor 86 will produce a change of potential at juncture point 90 which is differentiated by capacitor 88 and applied to the gate of silicon rectifier 50 for the purpose of causing silicon control rectifier 50 to switch to its low impedance state.

It is important to note that the mode of operation of the circuitry of FIG. 4 is substantially the same as that of FIG. 1, insofar as the manner in which variation in the resistance of the light sensitive device 22 affects the relative conduction time of silicon rectifiers 16 and 50. Improved operation characteristics are obtained by using the circuit in FIG. 4 in that much more reliable control of the conductivity state of silicon rectifiers 16 and 15 is obtained, since sharply rising pulses are applied as control signals to the respective gate electrodes.

It can readily be seen from the foregoing that the power control of the present invention is especially advantageous when utilized in those applications wherein signals are required at remote locations with the requirements that power for the signal means be supplied from batteries or from power generated on the site, since substantial conservation of energy is possible due to reduction in the average current being utilized. Further, if the signal is a light, the life of the lamps is extended substantially since the power applied to the lamp is never in excess of that for which the lamp is designed. Moreover, it is possible to use batteries whose output voltage is considerably in excess of that of the voltage rating of the lamp itself, permitting substantial deterioration in the battery without adverse affect on the character of the signal produced by the lamp. Any increase in the resistance of the lamp or blackening of the lamp envelope, as oftentimes results when the lamp is used, is automatically compensated for, mainaining the output of the lamp at a uniform level.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many posible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A power control for controlling the power applied to a source of radiant energy from a direct current voltage supply to maintain the intensity of radiation emitted from said source substantially constant that comprises:
    (a) means for generating and applying to said source a square wave signal of a substantially constant pulse repetition rate whose amplitude varies as a function of the supply voltage level; and
    (b) means for varying the width of each pulse as a function of the intensity of the energy emitted from said source to maintain the intensity of the energy emitted from said source at a substantially constant level.

2. A power control for controlling the power applied to a source of radiant energy from a direct current voltage supply to maintain the intensity of radiation emitted from said source substantially constant that comprises:
    (a) switching means adapted to be connected in series with a radiation source and a direct current voltage supply; and
    (b) control means for controlling said switching means to produce pulses of energy of a substantially constant pulse repetition rate, said pulses of energy having an amplitude which varies as a function of the voltage level of said direct current voltage supply;
    (c) said control means being effective to vary the width of each of said pulses as a function of the intensity of radiation emitted by said source to maintain the intensity of said radiation substantially constant.

3. A power control as defined in claim 2 wherein:
    (a) said switching means is characterized by having two electrodes and being one which normally exhibits a high impedance between said two electrodes in at least one direction but is switched to a quasi stable state in which said switching means exhibits a low impedance between said two electrodes in said at least one direction when a control signal is applied thereto and remains in said quasi stable state until the current flowing through said two electrodes in the at least one direction becomes less than the holding current of said switching means;
    (b) said switching means being connected by said two electrodes in series with a direct current voltage supply and a source of radiant energy;
    (c) said control signal means being effective to generate and apply to said switching means control signals having a substantially constant pulse repetition rate to switch said switching means to the quasi stable low impedance state; and
    (d) said control means further being effective responsive to the intensity of radiation emitted by said source of radiant energy for biasing said switching means to cause the current flowing through said two electrodes to become less than the holding current whereby said switching means returns to the high impedance state.

4. A power control circuit as defined in claim 3 wherein said switching means comprises a semi-conductor device having at least three regions defined therein, contiguous regions being of opposite type conductivity.

5. A power control circuit as defined in claim 3 wherein said switching means is a silicon controlled rectifier and wherein said control signal means comprises a relaxation oscillator.

6. A power control as defined in claim 3 wherein said source of radiant energy is a lamp and wherein said control includes a photosensitive element responsive to the intensity of light emitted by said lamp for biasing said switching means to cause the current flowing through said two electrodes to become less than the holding current whereby said switching means returns to the high impedance state.

7. A power control for controlling the power applied to a lamp from a direct current voltage supply to maintain the intensity of light emitted by the lamps substantially constant as the character of the lamp and voltage supply varies that comprises:
   (a) first and second silicon controlled rectifiers each having anode, cathode and gate electrodes;
   (b) means for connecting said first silicon controlled rectifier by said anode and cathode in series with a lamp and a direct current voltage supply;
   (c) means including a load device for connecting said silicon controlled rectifier by said anode and cathode in series with said direct current voltage supply;
   (d) a capacitor connected between the anodes of said first and second silicon controlled rectifiers for applying to one of said silicon controlled rectifiers a signal to bias said one silicon controlled rectifier off responsive to the other silicon controlled rectifier being biased on;
   (e) first control signal means for generating and applying to the gate electrode of the first silicon controlled rectifier a train of pulses of substantially constant pulse repetition rate, each of said pulses being of a character to bias said first silicon controlled rectifier on; and
   (f) second control signal means effective responsive to the intensity of the light emitted by the lamp for generating and applying to the gate electrode of the second silicon controlled rectifier a signal of a character to bias said second silicon controlled rectifier on.

8. A power control as defined in claim 7 wherein said first control signal means comprises a relaxation oscillator.

9. A power control as defined in claim 7 wherein said second control signal means comprises a transistor, means including a photosensitive element for biasing said transistor on, and means responsive to the conductive state of said transistor for applying to said second silicon controlled rectifier a signal of a character to bias said second silicon controlled rectifier on.

10. A power control as defined in claim 7 further including voltage regulating means for supplying to said first and second control signal means direct current supply voltage of a substantially constant level.

11. A power control as defined in claim 7, wherein said first control means includes a Zener diode for producing a reference voltage potential, and a relaxation oscillator means powered by said reference potential and having an output connected to the gate electrode of the first silicon controlled rectifier for producing a train of pulses of substantially constant pulse repetition rate, each of said pulses being of a character to bias said first silicon controlled rectifier on, and wherein said second control means includes a photoresistive element for biasing a transistor on responsive to the intensity of light emitted by said lamp, and means responsive to the conductivity level of said transistor for applying to said second control rectifier signals of a character to bias said second control rectifier on.

12. A light source characterized by a substantially constant output that comprises:
   (a) a lamp;
   (b) a source of direct current supply voltage;
   (c) switching means having two electrodes and which normally exhibits a high impedance between said two electrodes in at least one direction but which is switched to a quasi stable state in which said device exhibits a low impedance between said two electrodes in said at least one direction when a control signal is applied thereto and remains in said quasi stable state until the current flowing through said two electrodes in said at least one direction become less than the holding current of said switching means;
   (d) means for connecting said switching means by said two electrodes in series with said source of direct current supply voltage and said lamp;
   (e) means for generating and applying to said switching means control signals having a substantially constant pulse repetition rate to switch said switching means to the quasi stable low impedance state; and
   (f) means including a photosensitive element responsive to the intensity of light emitted by said lamp for biasing said switching means to cause the current flowing through said two electrodes to become less than the holding current whereby said switching means returns to the high impedance state.

13. A light source as defined in claim 12 wherein said switching means comprises:
   (a) a first silicon controlled rectifier having an anode, a cathode, and a gate electrode, said light source further including:
   (b) means for connecting said first silicon controlled rectifier by said anode and cathode electrodes in series with said lamp and said direct current voltage supply;
   (c) a second silicon controlled rectifier having an anode, a cathode, and a gate electrode;
   (d) means including a resistor for connecting said second silicon controlled rectifier by said anode and cathode in series with said direct current voltage supply;
   (e) a capacitor connected between the anodes of said first and second silicon controlled rectifiers for applying to one of said silicon controlled rectifiers a signal to bias said one silicon controlled rectifier off responsive to the other silicon controlled rectifier being biased on;
   (f) first control signal means for generating and applying to the gate electrode of the first silicon controlled rectifier a train of pulses of substantially constant pulse repetition rate, each of said pulses being of a character to bias said first silicon controlled rectifier on; and
   (g) second control signal means effective responsive to the intensity of the light emitted by the lamp for generating and applying to the gate electrode of the second silicon controlled rectifier a signal of a character to bias said second silicon controlled rectifier on.

14. A light source as defined in claim 13 wherein said first control signal means comprises a relaxation oscillator.

15. A light source as defined in claim 13 wherein said second control signal means comprises a transistor, means including a photosensitive element for biasing said transistor on, and means responsive to the conductive state of said transistor for applying to said second silicon controlled rectifier a signal of a character to bias said second silicon controlled rectifier on.

16. A light source as defined in claim 13 further including voltage regulating means for supplying to said first and second control signal means direct current supply voltage of a substantially constant level.

17. Light source as defined in claim 15 wherein said second control means further includes a capacitor and a uni-junction transistor, means connecting said transistor said capacitor, and said uni-junction transistor in a circuit whereby said uni-junction transistor is biased to a low impedance state responsive to said transistor being biased to a high conductivity state, said capacitor being discharged through said uni-junction transistor responsive to said uni-junction transistor being biased to a low impedance state, and means responsive to a discharge of said capacitor through said uni-junction transistor for applying to said second silicon controlled rectifier a signal of a character to bias said second silicon rectifier on.

References Cited

UNITED STATES PATENTS

| | | | |
|---|---|---|---|
| 2,253,976 | 8/1941 | Guanella | 315—151 X |
| 2,477,646 | 8/1949 | Perlow et al. | 250—205 X |
| 2,779,897 | 1/1957 | Ellis | 315—151 X |
| 2,850,676 | 9/1958 | Kan et al. | 315—107 X |
| 2,823,301 | 2/1958 | Stevens | 250—205 X |

JAMES W. LAWRENCE, Primary Examiner

C. R. CAMPBELL, Assistant Examiner

U.S. Cl. X.R.

250—205, 214; 307—311; 315—149, 158; 323—21